United States Patent
Matsumoto

(10) Patent No.: US 7,095,003 B2
(45) Date of Patent: Aug. 22, 2006

(54) IMAGE SENSOR WITH DEFORMATION PREVENTING DEVICE AND IMAGE INPUT/OUTPUT APPARATUS USING SAME

(75) Inventor: Toshio Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 999 days.

(21) Appl. No.: 10/083,562

(22) Filed: Feb. 27, 2002

(65) Prior Publication Data

US 2003/0053148 A1 Mar. 20, 2003

(30) Foreign Application Priority Data

Sep. 18, 2001 (JP) ............... 2001-283359

(51) Int. Cl.
*H04N 1/04* (2006.01)
(52) U.S. Cl. ............... 250/208.1; 358/483; 358/473
(58) Field of Classification Search ............. 250/208.1; 358/473, 474, 400, 471, 475, 482, 483, 493, 358/494, 496, 498
See application file for complete search history.

(56) References Cited

U.S. PATENT DOCUMENTS

| | | | | |
|---|---|---|---|---|
| 4,873,579 A | * | 10/1989 | Kubota et al. ............... 358/471 |
| 5,254,847 A | * | 10/1993 | Hata et al. ............... 250/208.1 |
| 5,281,803 A | * | 1/1994 | Ishizuka ............... 250/208.1 |
| 5,489,992 A | | 2/1996 | Endo |
| 5,489,995 A | * | 2/1996 | Iso et al. ............... 358/483 |
| 5,517,329 A | * | 5/1996 | Ishizuka ............... 358/474 |
| 5,569,390 A | | 10/1996 | Endo |
| 6,147,778 A | * | 11/2000 | Yamada et al. ............. 358/474 |
| 2002/0092967 A1 | * | 7/2002 | Matsumoto ............. 250/208.1 |

FOREIGN PATENT DOCUMENTS

| JP | 5-347683 | 12/1993 |
|---|---|---|
| JP | 6-22086 | 1/1994 |

* cited by examiner

*Primary Examiner*—Stephone B. Allen
(74) *Attorney, Agent, or Firm*—Oblon, Spivak, McClelland, Maier & Neustadt, P.C.

(57) ABSTRACT

There is a problem that the contact-type image sensor, for adoption in an image input/output apparatus to input/output the image of a large-sized document, such as A0 or A1 size, is weak in lengthwise rigidity and readily deflected at its lengthwise center by its own weight. Accordingly, by attaching a deformation rectifier to the image sensor in a lengthwise direction thereof, the contact type image sensor is reinforced in lengthwise rigidity. The deformation rectifier reinforces the rigidity of the contact type image sensor, thereby preventing the contact type image sensor from deflecting vertically relative to its lengthwise direction and keeping constant the focal length between the surface of the document to be read and the sensor IC.

14 Claims, 7 Drawing Sheets

(a)

(b)

(a)

(b)

IMAGE SENSOR WITH DEFORMATION PREVENTING DEVICE AND IMAGE INPUT/OUTPUT APPARATUS USING SAME

TECHNICAL FIELD

This invention relates to an image input/output apparatus for reading the image of a large-sized document paper, such as A0 or A1 size, and outputting the image read from the document paper. The invention is concerned, particularly, with a contact type image sensor for use in an image input section of the image input/output apparatus.

BACKGROUND ART

FIGS. 10 and 11 are views showing a conventional image sensor. FIG. 10 is a sectional view showing a structure of a general contact-type image sensor. Meanwhile, FIG. 11 is a front view of the contact type image sensor shown in FIG. 10 as viewed in the direction of the arrow. In FIGS. 10 and 11, 1 is a contact-type image sensor (hereinafter, referred to as image sensor), 2 is a document, 3 is a glass plate positioned in the document scanning plane, 4 is a sensor frame, 5 is a light source, 6 is a rod-lens array, 7 is a sensor IC, 8 is a sensor board, 9 is a L-form plate, 10 is a screw hole, 11 is a screw, 12 is a light shielding spacer and 13 is a cover provided on both sides of the sensor frame.

The parts structuring the contact type image sensor are assembled on the sensor frame 4. The sensor frame 4 is structured by two sensor frames 4A, 4B. The light source 5 is a line light source and uses a fluorescent tube lamp, light-emitting diode or the like. The image sensor 1 shown in FIG. 10 has two light sources 5 but one is satisfactory. The rod lens array 6 is a rod lens array for 1:1 imaging. This rod lens array 6 is fixed, without giving a gap, in the plane of contact between the sensor frames 4A and 4B and the rod lens array 6 by using a double-sided tape or adhesive. The sensor board 8 is arranged with the sensor ICs 7 in a line form. Meanwhile, the light shielding spacer 12, for preventing the sensor ICs 7 from being exposed to external light, is provided on the sensor board 8. The sensor board 8 is supported on the L-form plate 9 having a section in an L-form. The L-form plate 9 is fixed on the sensor frame 4A by using the screw hole 10 and screw 11. The diameter of the screw hole 10 is formed greater than the diameter of the screw 11.

Next, explanation is made on the operation of the image sensor 1. The light from the light source 5 passes through the glass plate 3 to illuminate evenly the reading surface of a document 2. The light reflected from the reading surface of the document 2 passes through the glass plate 3 and rod lens array 6 and focuses on the sensor IC 7. The reflection light from the document 2 reaching the sensor IC 7 contains the light/dark visual information characterizing the reading surface of the document 2. The sensor IC 7 detects the light/dark information and stores corresponding electric charges, and outputs the charge information to the outside through a circuit formed on the sensor board 8. The image sensor 1 prior to its use is adjusted for proper focusing so that the reflection light from the document 2 can be correctly focused on the sensor IC 7.

Although different depending on a kind of the image input/output apparatus, the distance x between the reading surface of a document 2 transported through not-shown rollers and the glass plate 3 is set to about 0.4 mm–1.0 mm. Focus adjustment is made on the premise that the distance between the reading surface of the document 2 and the glass plate 3 is kept at nearly 0.4 mm–1.0 mm. The screw hole 10, provided in the L-form plate 9 mounted with the sensor ICs 7 and sensor board 8, has a diameter formed greater than the diameter of the screw 11. Consequently, within its range the L-form plate 9 can adjust the distance between the sensor IC 7 and the rod lens array 6. Focus adjustment is made by tightening the screw 11 to move the sensor IC 7 to the position where the reflection light from the document 2 is correctly focused on the sensor IC 7. The distance required for the reflection light from the document 2 to be properly focused on the sensor IC 7, is referred to as the focal length.

The explained contact type image sensor accommodates the glass plate 3, lens such as a rod lens array 6, light source 5, sensor IC 7 and an image reading mechanism such as the sensor IC board 8 properly within a housing such as a cover 4. The image sensor described above reads a document of large size, such as A0 or A1 size. The lengthwise size is 1 meter or somewhat smaller for reading out A0 size and 0.7 meter or somewhat smaller for reading out A1 size. On the other hand, the thickness is as small as nearly 40 mm. Differently from the sensor for a size-reducing optical system requiring a predetermined focal length between a focusing sensor and a document, the contact type image sensor can be conspicuously reduced in focus light path length hence having a merit that the image input/output apparatus can be greatly reduced in size.

In the meanwhile, the image sensor for adoption in an image input/output apparatus for inputting and outputting a document in a large size such as A0 or A1 size has a lengthwise dimensions of 0.7–1.0 meter or somewhat smaller relative to the thickness of nearly 40 mm. Consequently, there is a problem that the contact type image sensor is insufficient in lengthwise rigidity and readily bends at the center by its own weight. FIGS. 12 and 13 are explanatory views showing a contact type image sensor bent at the lengthwise center. FIG. 12 is a view showing the state that the glass plate 3 of the image sensor 1 is attached facing in an upward direction. FIG. 13 is a view showing the state that the glass plate 3 of the image sensor 1 is attached facing in a downward direction.

As shown in FIG. 12, in the case that the image sensor 1 attached with the glass plate 3 in the upward direction is bent in its longitudinal center by its own weight by −Δ1 in a concave form with respect to the document 2, and so the distance between the document reading surface at a lengthwise center and the glass plate becomes greater than the prescribed value (0.4–1.0 mm). Meanwhile, as shown in FIG. 13, where the image sensor 1 attached with the glass plate 3 in a downward direction is bent in its longitudinal center by Δ1 in a convex form with respect to the document 2, the distance between the document reading surface at the center and the glass plate becomes smaller than the prescribed value (0.4–1.0 mm). Namely, if the image sensor is bent by its own weight, the focal length between the document reading surface and the sensor IC varies. Due to this, the reflection light from the document reading surface is not correctly focused on the sensor IC thus causing deterioration of the resolution of the image read.

The present invention has been made in order to resolve the above explained problem.

SUMMARY OF THE INVENTION

It is a first object of the present invention to provide a contact type image sensor that solves the problem where the contact type image sensor is bent at the longitudinal center by its own weight.

It is a second object of the invention to provide a high-resolution image input/output apparatus provided with the contact type image sensor that solves the problem that the contact type image sensor if bent at the longitudinal center by its own weight.

An image sensor according to the present invention comprises: a glass plate; a light source for illuminating the surface of the document to be read through the glass plate; a lens for focusing the light from the light source and reflected from the document to a predetermined position; an image reading device for converting the light passing the lens and reflected from the document into image read-out information; a housing accommodating and supporting the glass plate, the light source, the lens and the image reading device in a predetermined position and having length greater than a width of the document; and a deformation preventing device formed along a lengthwise direction of the housing and reinforcing rigidity of the housing to thereby prevent the housing from bending outward in the direction perpendicular to the length, thereby keeping constant the focal length between the reading surface of the document and the image reading device.

An image input/output apparatus according to the present invention comprises: a document inserting inlet for inserting a document from the outside to be read for a copying image; a roller for transporting the document inserted from the document inserting inlet; a light source for illuminating a reading surface of the document inserted at the document inserting inlet and transported by the roller, a lens for focusing light from the light source and reflected from the reading surface of the document to a predetermined position, an image reading device for converting the light reflected from the document and passing the lens into image readout information, a housing accommodating and supporting the light source, the lens and the image reading device in a predetermined position and formed to have a length greater than the width of the document; and a deformation preventing device formed along the lengthwise direction of the housing and reinforcing rigidity of the housing, thereby preventing the focal length between the reading surface of the document and the image reading device from varying; and an image information output device for outputting image information read out by this image sensor to the outside.

DETAILED DESCRIPTION OF THE INVENTION

Figure 1:
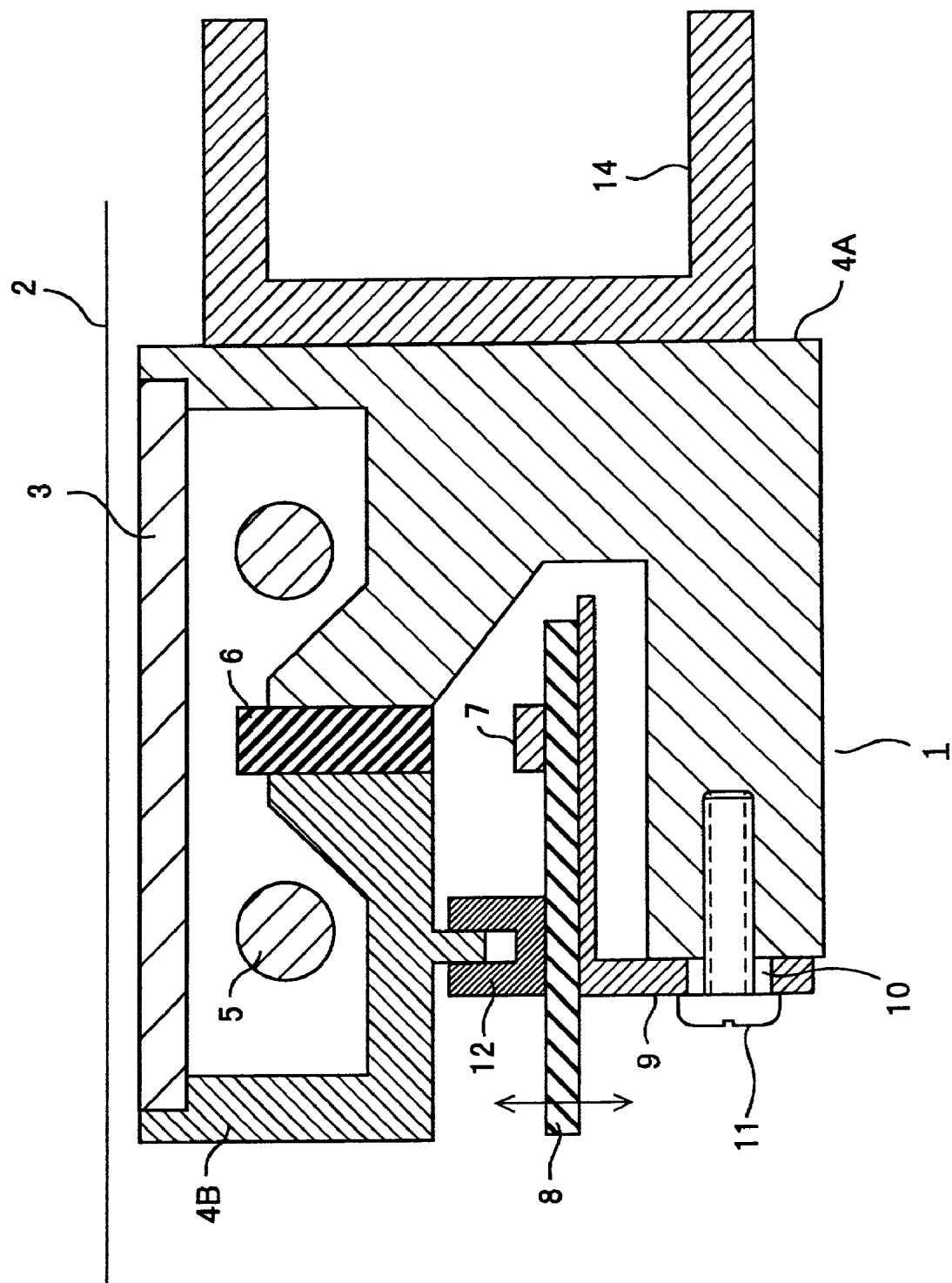
FIG. 1 is a sectional view showing a structure of a contact type image sensor according to the present invention.

FIG. 1 is a sectional view showing a structure of a contact type image sensor according to the present invention. In FIG. 1, 1 is an image sensor of the invention, 2 is a document as a subject of image reading, 3 is a glass plate arranged with a predetermined spacing from the document 2, 4 is a sensor frame which is a housing with length greater than the width of the document 2, 5 is a light source to illuminate the surface of the document 2 to be read through the glass plate 3, 6 is a rod-lens array as a lens to focus to a predetermined position the light illuminated from the light source 5 and reflected from the reading surface of the document 2, 7 is a sensor IC which is an image reading means to convert into image information contained in the light reflected from the document and passing through the rod-lens array 6, 8 is a sensor board mounted with the sensor ICs 7, 9 is an L-form plate, 10 is a screw hole, 11 is a screw, 12 is a light shielding spacer, 14 is a deformation rectifier formed along the length of the sensor frame 4 to reinforce the rigidity of the same and prevent bending perpendicularly to the lengthwise direction, thereby keeping constant the focal length between the reading surface of the document 2 and the sensor IC 7, and 15 is an attaching jig.

Figure 2:
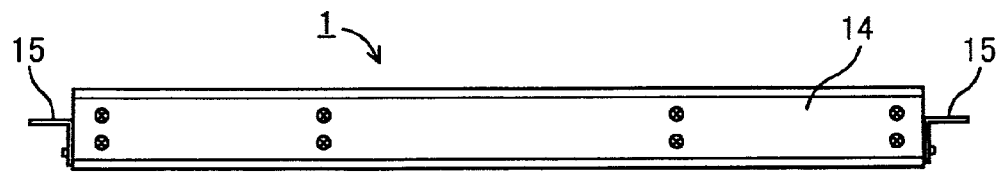
FIG. 2 is a plan view showing a side surface of the contact type image sensor of the invention.
Figure 3:
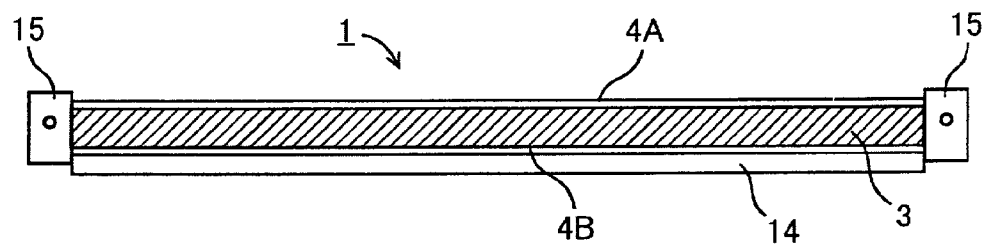
FIG. 3 is a plan view showing a side surface of the contact type image sensor of the invention.
Figure 4:
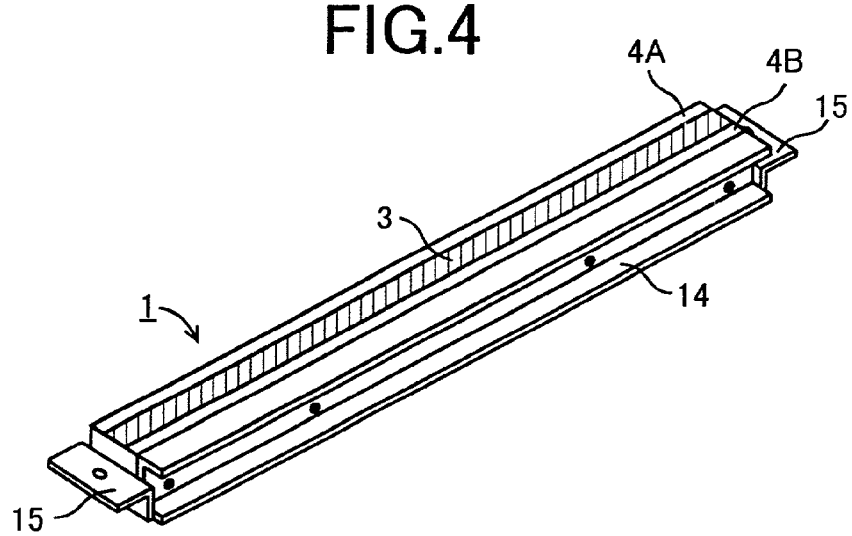
FIG. 4 is a perspective view of the contact type image sensor of the invention.

FIG. 2 is a plan view showing a side surface of the contact type image sensor of the invention. FIG. 3 is a plan view showing a side surface of the contact type image sensor of the invention. FIG. 4 is a perspective view of the contact type image sensor of the invention. Note that, in FIGS. 2 to 4, the same reference numeral as that of FIG. 1 designates the same or corresponding part and hence omittedly explained.

As shown in FIG. 1, the deformation rectifier 14 is formed bent at its ends to be convex in cross section of the opposite ends and a concave in cross section of the center. The deformation rectifier 14 uses a material of aluminum, preferably iron. It is satisfactory to use a material other than metal, e.g. resin. The deformation rectifier 14, contacted at its cross sectional-concave portion with the side of the sensor frame 4A, is screw-fastened and fixed thereto. Note that the method of fixing the deformation rectifier 14 is not limited to screw-fastening. Where an adhesion force is available sufficiently for supporting the deformation caused by a self-weight of the image sensor 1, adhesive or double-sided tape may be used.

FIG. 2 shows the lengthwise side of the image sensor as viewed from the deformation rectifier 14. In FIG. 2, 15 is a metal attaching jig defining a position to mount the image sensor 1 onto an image input/output apparatus. The sensor frame 4 which is the housing of the image sensor 1, because it is positioned in the back of the deformation rectifier 14, is not shown in FIG. 2. The sensor frame 4 is formed such that its length is greater than the width of the document 2. The deformation rectifier 14 is formed such that its length is nearly coincident with the length of the sensor frame 4. FIG. 3 shows the lengthwise side surface of the image sensor as viewed from the glass plate 3. Meanwhile, FIG. 4 shows a perspective view of the image sensor in the state that the glass plate 3 is directed up. It is clearly shown that the deformation rectifier 14 is bent having convex portions at the sectional opposite ends and a concave portion at the sectional center and that the length of the deformation rectifier 14 is nearly coincident with the length of the sensor frame 4.

Figure 5:
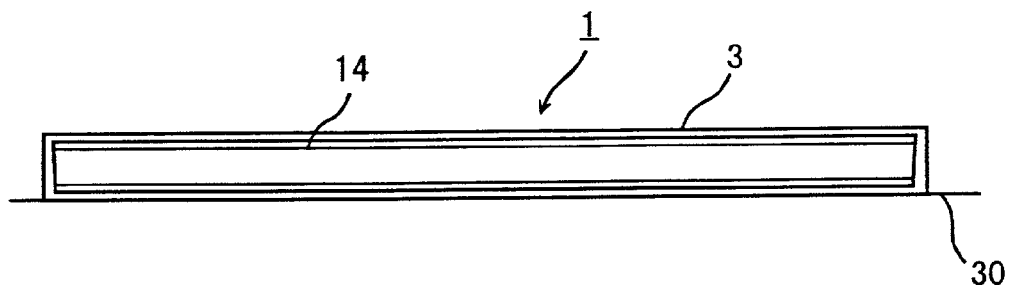
FIG. 5 is an explanatory view showing a first method for fixing a deformation rectifier to the image sensor.

FIG. 5 is an explanatory view showing a first method for fixing the deformation rectifier 14 to the image sensor 1. In FIG. 5, 30 is a plane. Note that, in FIG. 5, the same reference character as that of FIG. 1 designates the same or corresponding part and hence is not explained. Prior to fixing the deformation rectifier 14 to the image sensor 1, an external force is applied to the image sensor 1 with the image sensor 1 placed on a plane 30, thereby rectifying deformation or warp of the image sensor 1. Then, a deformation rectifier 14 is fixed to the image sensor 1 rectified in shape. As explained above, the image sensor 1 is placed on a plane 30 and an external force is applied to rectify deformation or warp, in which state the deformation rectifier 14 is fixed. This can remove the deformation or warp existing in the post-manufacture image sensor 1 in advance of being mounted to the image input/output apparatus. Meanwhile, if the rigidity of the deformation rectifier 14 is higher than the rigidity of the image sensor 1, it is possible to prevent new deformation from being caused by the weight of the image sensor 1. Accordingly, prior to mounting of the deformation rectifier 14, the image sensor 1 in a state can be kept rectified of deformation or warp for a long term.

Figure 6:
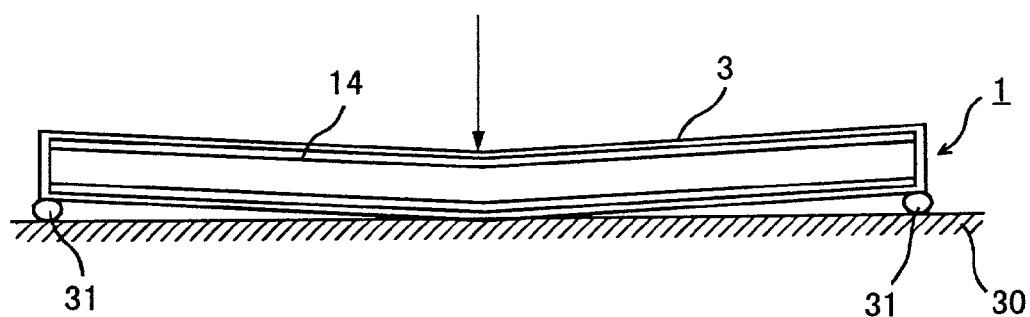
FIG. 6 is an explanatory view showing a second method for fixing a deformation rectifier to the image sensor.

The first fixing method explained referring to FIG. 5 includes, prior to mounting the deformation rectifier 14 to the image sensor, application of an external force to the image sensor 1 on a plane 30 to rectify the deformation or warp existing in the image sensor so that the deformation rectifier 14 is mounted to the image sensor 1 which is in a rectified state. On the other hand, it is possible to contemplate a method that, before mounting the deformation rectifier 14 to the image sensor 1, the image sensor 1 is previously provided with constant deformation so that the deformation rectifier 14 is attached to the image sensor 1 in the deflected state. FIG. 6 is an explanatory view showing a second method for fixing the deformation rectifier 14 to the image sensor 1. In FIG. 6, 31 is a spacer. Note that, in FIG. 6, the same reference numeral as that of FIG. 5 designates the same or corresponding part and hence is not explained.

Before fixing the deformation rectifier 14 to the image sensor 1, the spacer 31 is inserted between the lengthwise opposite ends of the image sensor 1 placed with the glass plate 3 directed up and the plane 30. An external force is applied to the image senor 1 whose lengthwise opposite ends are supported by the spacer 31 to intentionally deflect the image sensor 1 by a predetermined amount. As shown by the arrow in FIG. 6, by applying an external force to the image sensor 1 at its lengthwise center or its vicinity, the image sensor 1 can possess a recessed deformation in the center or its vicinity. The deformation rectifier 14 is fixed to the image sensor 1 thus intentionally given deformation. By fixing the deformation rectifier 14 to the image sensor 1 intentionally deflected by a predetermined amount, the deformation state of the image sensor 1 can be kept for a long term. More specifically, by attaching the image sensor to the image input/output apparatus such that the glass plate 3 is facing down, the deflecting direction of the image sensor 1 by its own weight is reverse to the direction of intentional deformation by the above method, thus making it possible to keep the focal length from varying. Incidentally, by properly adjusting the spacer diameter, the image sensor 1 can be adjusted in deformation amount.

Figure 7:
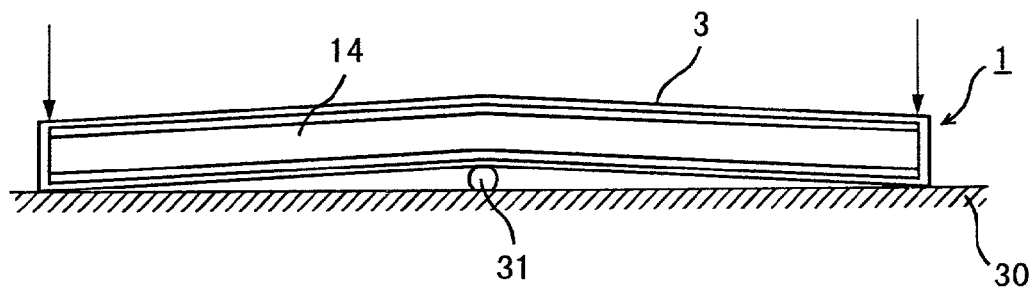
FIG. 7 is an explanatory view showing a third method for fixing a deformation rectifier to the image sensor.

FIG. 7 is an explanatory view showing a third method for fixing the deformation rectifier 14 to the image sensor 1. In FIG. 7, the same reference numeral as that of FIG. 6 designates the same or corresponding part and hence is not explained. Before fixing the deformation rectifier 14 to the image sensor 1, the spacer 31 is inserted between the lengthwise center of the image sensor positioned so that the glass plate 3 is directed up on the plane 30. Then, an external force is applied to both lengthwise ends of the image sensor 1 supported at the lengthwise center by the spacer 31. By this operation, a predetermined amount of intentional deformation is given to the image sensor 1. As shown by the arrow in FIG. 7, by applying an external force to both lengthwise ends of the image sensor 1, the image sensor 1 can be given a deformation in its center or its vicinity, thus being warped in a convex form. The deformation rectifier 14 is fixed to the image sensor 1 thus given with intentional deformation. Similarly to the second fixing method explained while referring to FIG. 6, the state in which the image sensor 1 is deflected can be kept for a long term by fixing the deformation rectifier 14 to the image sensor 1 intentionally deflected by a predetermined amount. More specifically, if attached to the image input/output apparatus such that the glass plate positions up, because the direction of deformation due to the self-weight of the image sensor 1 is reverse to the direction of intentional deformation by the above method, the focal light path length can be kept from varying.

As explained above, by providing the deformation rectifier 14 to the image sensor 1, the image sensor 1 can be reinforced in lengthwise rigidity. Consequently, the problem that the image sensor is deflected at the central portion by its own weight is solved. The invention, is suited for a contact type image sensor having a length of 0.7 m–1.0 m for reading large-size documents, such as A0 to A1 size which is liable to be lacking in lengthwise rigidity.

Figure 8:
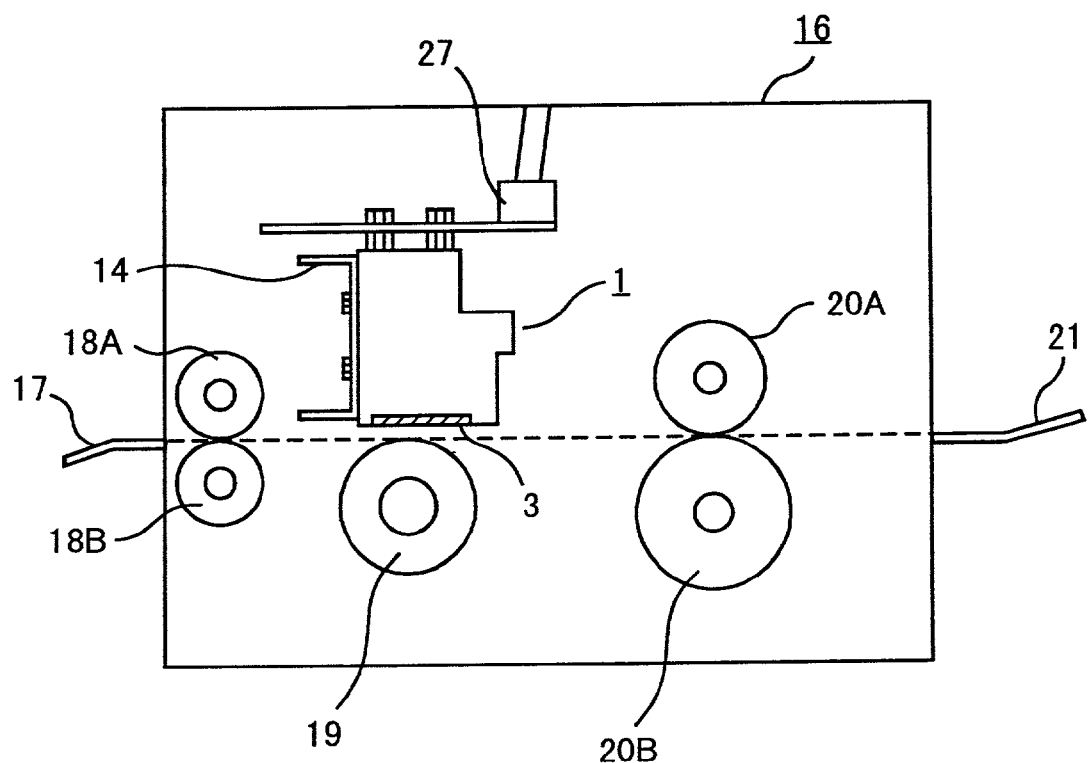
FIGS. 8(a) and 8(b) are sectional views showing a structure of an image input/output apparatus provided with the contact type image sensor of the invention.
Figure 8:
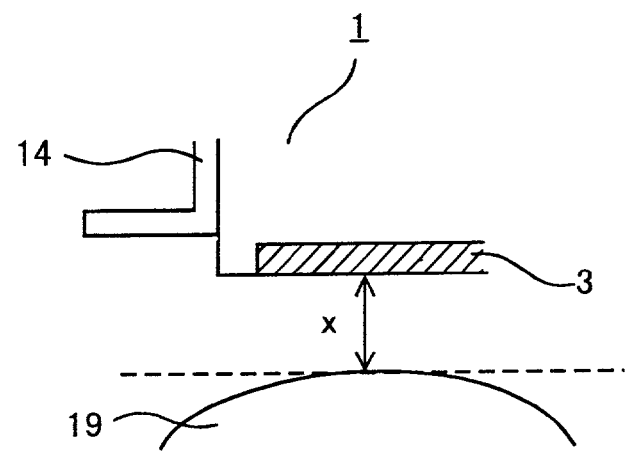

FIG. 8 is a sectional view showing a structure of the image input/output apparatus using the explained contact type image sensor. In FIG. 8, 16 is an image input/output apparatus, 17 is a paper tray, 18 is a paper feed roller, 19 is a paper transport roller, 20 is a paper eject roller, 21 is an eject paper tray, and 27 is an image information output section to output read-out image information to the outside. The broken line between the paper tray 17 and the eject paper tray 21 in the upper part of FIG. 8(a) designates a route to transport a document. Note that, in FIG. 8, the same reference numeral as that in FIG. 1 designates the same or corresponding part and hence is not explained. The image sensor 1 shown in FIG. 8 is provided with the deformation rectifier 14 thus reinforcing the lengthwise rigidity of the image sensor 1. The image sensor 1 is attached on the image input/output apparatus 16 such that the glass plate 3 is directed down. A document is to be transported to be in a position spaced by a predetermined distance X from the glass plate 3.

As shown in FIG. 8(b), the glass plate 3 of the image sensor 1 and the document to be read are separated by the predetermined distance X. More specifically, the paper transport roller 19 is arranged in such a position that the document is transported to be in the position separated by the predetermined distance X from the glass plate 3. The distance X between the glass plate 3 and the document is about 0.4 mm–1.0 mm. The image sensor is set in focus such that the resolution of image reading is the highest when the glass plate 3 and the document are spaced by the predetermined distance X. Namely, precise image reading is possible unless there is no change in the predetermined distance X between the document and the glass plate 3 or in the focal length including the distance of from the glass plate 3 to the sensor IC (not shown).

The image sensor 1 shown in FIG. 8 has the deformation rectifier 14. The deformation rectifier 14 reinforces the lengthwise rigidity of the image sensor 1 and suppresses the image sensor from being deflected by its own weight. Accordingly, the problem that the focal length between the sensor IC 7 within the image sensor and the document varies is solved. Namely, the image input/output apparatus having such an image sensor 1 keeps the interval between the sensor IC 7 of the image sensor 1 and the document at the focal length and hence correctly focuses the reflection light from the document onto the IC sensor. Consequently, the image input/output apparatus having the image sensor can keep a high-resolution image reading function for a long term. The image information the sensor IC 7 has read out of the light reflected from the document 2 is forwarded to the image information output section 27. The image information output section 27 processes the image information according to the application, such as for a copier, facsimile or scanner, and outputs the image information to the outside.

Figure 9:
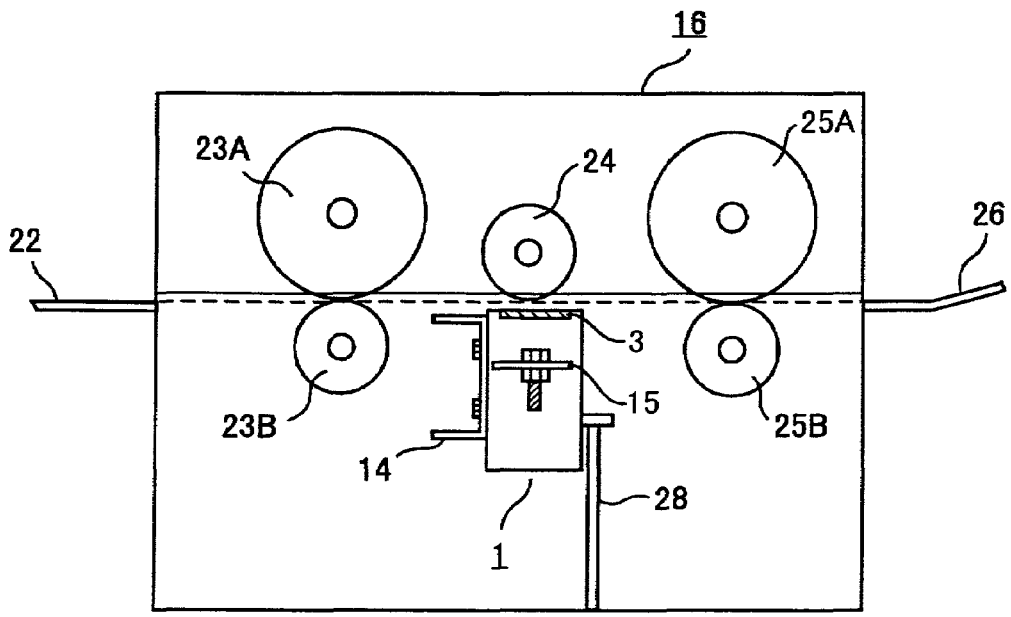
FIGS. 9(a) and 9(b) are sectional views is a sectional view showing a structure of an image input/output apparatus provided with the contact type image sensor of the invention.
Figure 9:
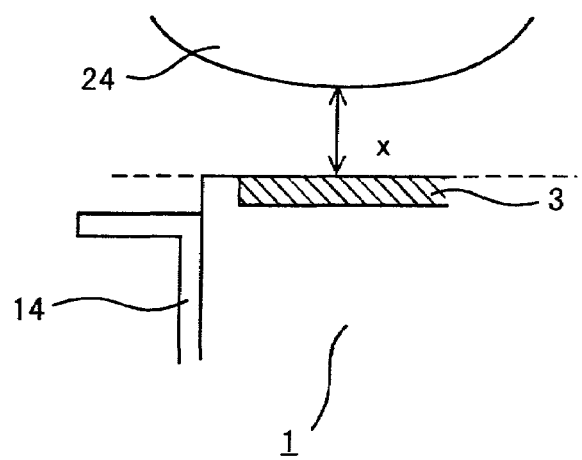
Figure 10:
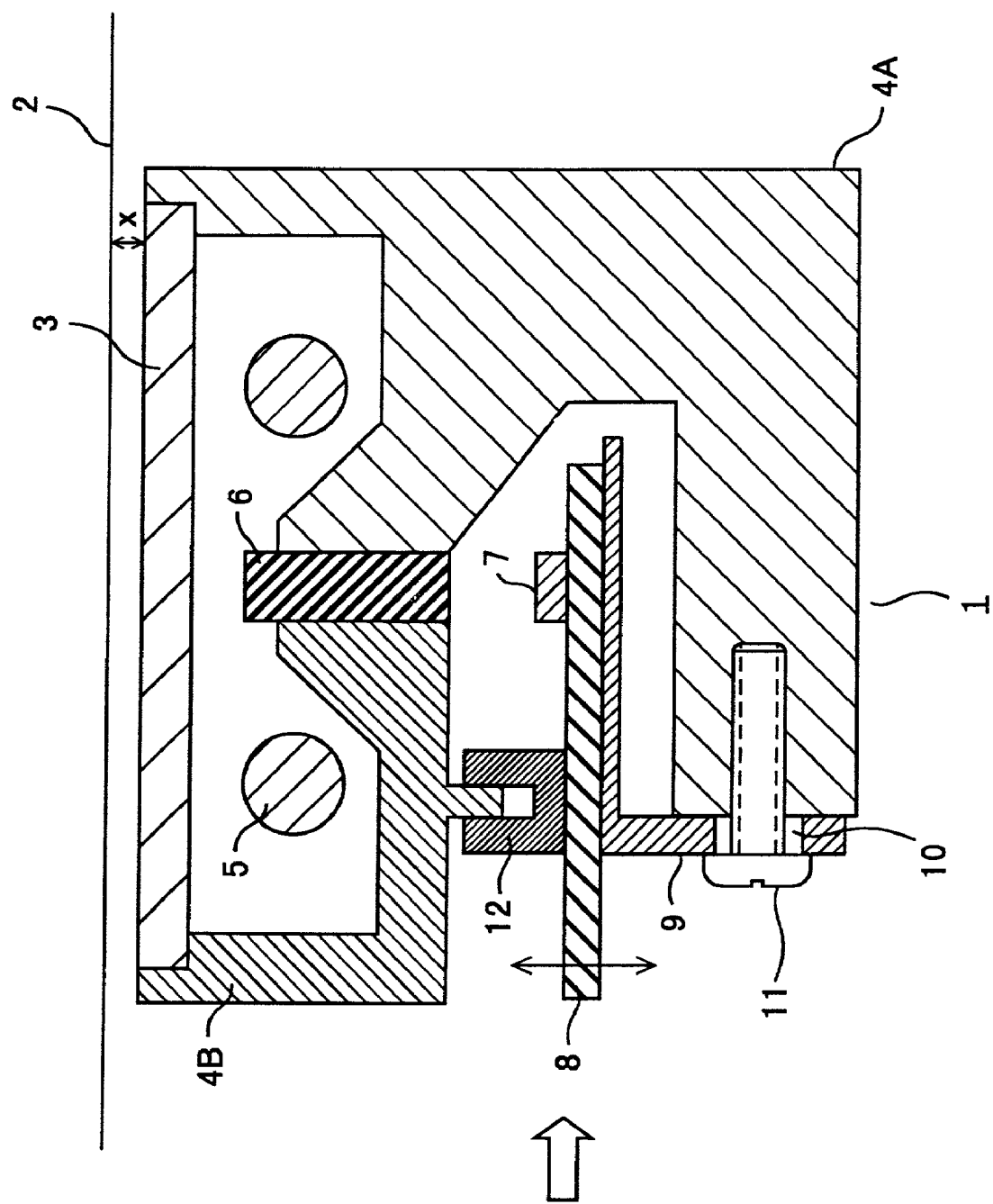
FIG. 10 is a sectional view showing a structure of a conventional contact type image sensor.
Figure 11:
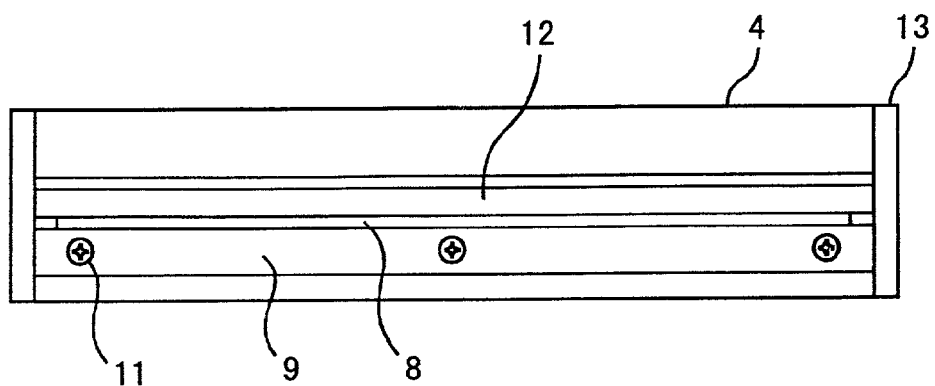
FIG. 11 is a front view of the conventional contact type image sensor.
Figure 12:
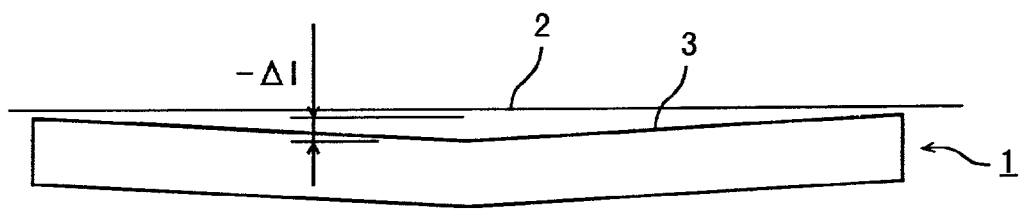
FIG. 12 is an explanatory view showing a state that the contact type image sensor is deflected at a lengthwise central region.
Figure 13:
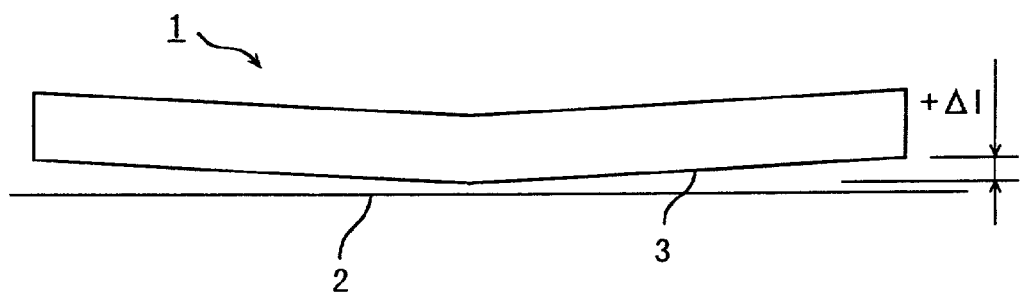
FIG. 13 is an explanatory view showing a where the contact type image sensor is bent at the longitudinal central region.

Meanwhile, FIG. 9 is a sectional view showing a structure of an image input/output apparatus using the contact type image sensor according to the explanation. In FIG. 9, 16 is an image input/output apparatus, 22 is a feed paper tray, 23 is a paper feed roller, 24 is a paper transport roller, 25 is a paper eject roller, 26 is an eject paper tray and 28 is an image input/output section. The broken line between the feed paper tray 22 and the eject paper tray 26 shows a route to transport a document. Note that, in FIG. 9, the same reference numeral as that in FIG. 8 designates the same or corresponding part and hence is not explained. The image sensor 1 shown in FIG. 9 is provided with the deformation rectifier 14, thus reinforcing the lengthwise rigidity of the image sensor 1. The image sensor 1 is arranged in the image input/output apparatus 16 such that the glass plate 3 is directed up. A document is to be transported to a position at a predetermined distance X from the glass plate 3.

As shown in FIG. 9(*b*), the glass plate 3 of the image sensor 1 and the document to be read are spaced by the predetermined distance X. More specifically, the paper transport roller 24 is arranged in such a position that the document is transported to be in the position at the predetermined distance X from the glass plate 3. The distance X between the glass plate 3 and the document is about 0.4 mm–1.0 mm. The image sensor is set in focus such that the resolution of image reading is the highest when the glass plate 3 and the document are spaced by the predetermined distance X. Namely, precise image reading can be made unless there is no change in the predetermined distance X between the document and the glass plate 3 or the focal length including the distance from the glass plate 3 to the sensor IC (not shown).

The image sensor 1 shown in FIG. 9 has the deformation rectifier 14. Accordingly, the problem that the image sensor 1 is bent in its lengthwise center by its own weight, thereby changing the distance between the document and the glass plate 3 is prevented from arising. In other words, if the distance between the document and the glass plate 3 can be kept constant at the predetermined distance, the focal light path length between the document and the IC sensor within the image sensor 1 can also be kept constant. Therefore, because the reflection light from the document is correctly focused on the IC sensor, the high-resolution image reading function can be maintained for a long term.

What is claimed is:

1. An image sensor comprising:
    a glass plate for passing through the light reflected from a document arranged at a predetermined distance from said glass plate;
    a light source for illuminating the surface of a document to be read through said glass plate;
    a lens for focusing, to a predetermined position, light emitted from said light source and reflected from the reading surface of the document;
    an image reading device for converting the light reflected from the document and passing through said lens into image read-out information;
    a housing accommodating and supporting said glass plate, said light source, said lens and said image reading device in a predetermined position and formed to have a length greater than a width of the document; and
    a deformation preventing device formed along and attached at only one surface of the lengthwise direction of said housing and reinforcing rigidity of said housing to thereby prevent said housing from deflecting perpendicularly to the lengthwise direction, thereby keeping the interval between the surface of the document to be read and said image reading device constant at the focal length.

2. An image sensor according to claim 1, wherein said deformation preventing device, in a state where said glass plate is directed up, is provided on said housing having been bent in a lengthwise central region of said housing to be in a concave form relative to both ends thereof.

3. An image sensor according to claim 2, wherein said housing, in a state rested on supports provided at both lengthwise ends thereof, is bent in a concave form due to applying an external force to a lengthwise central region thereof.

4. An image sensor according to claim 1, wherein said deformation preventing device, in a state where said glass plate is directed up, is provided on said housing having been bent in the lengthwise central region of said housing to be in a convex form relative to both ends thereof.

5. An image sensor according to claim 3, wherein said housing, in a state rested on supports provided at a lengthwise central region thereof, is bent in a convex form due to applying an external force both lengthwise ends thereof.

6. An image input/output apparatus comprising:
    a document inserting inlet for inserting a document for image reading from the outside;
    a roller for transporting the document inserted from said document inserting inlet;
    an image sensor including,
        a light source for illuminating the surface of the document to be read and inserted at said document inserting inlet and transported by said roller,
        a lens for focusing light emitted from said light source and reflected from the surface of the document to a predetermined position,
        an image reading device for converting the light reflected from the document and passing through said lens into image read-out information,
        a housing accommodating and supporting said light source, said lens and said image reading device in a predetermined position and formed to have a length greater than the width of the document, and a deformation preventing device formed along and attached at only one surface of a lengthwise direction of said housing and reinforcing rigidity of said housing, thereby keeping the interval between the surface of the document to be read and said image reading device at the focal length; and a read-out image information output device for outputting image information read out by said image sensor to the outside.

7. An image input/output apparatus according to claim 6, wherein said image sensor, when in a state that a glass plate provided in the housing spaced at a predetermined distance from the document for image reading is directed up, has had a deformation preventing device fixed on said housing after the housing has been bent in a concave form at the lengthwise central region relative to both ends thereof, and then arranged in an input/output apparatus housing such that said glass plate is directed down.

8. An image input/output apparatus according to claim 6, wherein said image sensor, when in a state that a glass plate provided in the housing spaced by a predetermined distance from the document for image reading is directed up, has a deformation preventing device fixed in said housing after the housing has been bent in a convex form at a lengthwise central region of said housing relative to both ends thereof and then is arranged in an input/output apparatus housing such that said glass plate is directed up.

9. An image sensor comprising:
a glass plate for passing through the light reflected from a document arranged at a predetermined distance from said glass plate;
a light source for illuminating the surface of a document to be read through said glass plate;
a lens for focusing, to a predetermined position, light emitted from said light source and reflected from the reading surface of the document;
an image reading device for converting the light reflected from the document and passing through said lens into image read-out information;
a housing accommodating and supporting said glass plate, said light source, said lens and said image reading device in a predetermined position and formed to have a length greater than a width of the document; and
a deformation preventing device formed along the lengthwise direction of said housing and reinforcing rigidity of said housing to thereby prevent said housing from deflecting perpendicularly to the lengthwise direction, thereby keeping the interval between the surface of the document to be read and said image reading device constant at the focal length,
wherein said deformation preventing device, in a state where said glass plate is directed up, is provided on said housing having been bent in a lengthwise central region of said housing to be in a concave form relative to both ends thereof.

10. An image sensor according to claim 9, wherein said housing, in a state rested on supports provided at both lengthwise ends thereof, is bent in a concave form due to applying an external force to a lengthwise central region thereof.

11. An image sensor comprising:
a glass plate for passing through the light reflected from a document arranged at a predetermined distance from said glass plate;
a light source for illuminating the surface of a document to be read through said glass plate;
a lens for focusing, to a predetermined position, light emitted from said light source and reflected from the reading surface of the document;
an image reading device for converting the light reflected from the document and passing through said lens into image read-out information;
a housing accommodating and supporting said glass plate, said light source, said lens and said image reading device in a predetermined position and formed to have a length greater than a width of the document; and
a deformation preventing device formed along the lengthwise direction of said housing and reinforcing rigidity of said housing to thereby prevent said housing from deflecting perpendicularly to the lengthwise direction, thereby keeping the interval between the surface of the document to be read and said image reading device constant at the focal length,
wherein said deformation preventing device, in a state where said glass plate is directed up, is provided on said housing having been bent in the lengthwise central region of said housing to be in a convex form relative to both ends thereof.

12. An image sensor according to claim 11, wherein said housing, in a state rested on supports provided at a lengthwise central region thereof, is bent in a convex form due to applying an external force both lengthwise ends thereof.

13. An image input/output apparatus comprising:
a document inserting inlet for inserting a document for image reading from the outside;
a roller for transporting the document inserted from said document inserting inlet;
an image sensor including,
    a light source for illuminating the surface of the document to be read and inserted at said document inserting inlet and transported by said roller,
    a lens for focusing light emitted from said light source and reflected from the surface of the document to a predetermined position,
    an image reading device for converting the light reflected from the document and passing through said lens into image read-out information,
    a housing accommodating and supporting said light source, said lens and said image reading device in a predetermined position and formed to have a length greater than the width of the document, and
    a deformation preventing device formed along a lengthwise direction of said housing and reinforcing rigidity of said housing, thereby keeping the interval between the surface of the document to be read and said image reading device at the focal length; and
a read-out image information output device for outputting image information read out by said image sensor to the outside,
wherein said image sensor, when in a state that a glass plate provided in the housing spaced at a predetermined distance from the document for image reading is directed up, has had a deformation preventing device fixed on said housing after the housing has been bent in a concave form at the lengthwise central region relative to both ends thereof, and then arranged in an input/output apparatus housing such that said glass plate is directed down.

14. An image input/output apparatus comprising:
a document inserting inlet for inserting a document for image reading from the outside;

a roller for transporting the document inserted from said document inserting inlet;

an image sensor including, a light source for illuminating the surface of the document to be read and inserted at said document inserting inlet and transported by said roller, a lens for focusing light emitted from said light source and reflected from the surface of the document to a predetermined position, an image reading device for converting the light reflected from the document and passing through said lens into image read-out information, a housing accommodating and supporting said light source, said lens and said image reading device in a predetermined position and formed to have a length greater than the width of the document, and a deformation preventing device formed along a lengthwise direction of said housing and reinforcing rigidity of said housing, thereby keeping the interval between the surface of the document to be read and said image reading device at the focal length; and a read-out image information output device for outputting image information read out by said image sensor to the outside, wherein said image sensor, when in a state that a glass plate provided in the housing spaced by a predetermined distance from the document for image reading is directed up, has a deformation preventing device fixed in said housing after the housing has been bent in a convex form at a lengthwise central region of said housing relative to both ends thereof and then is arranged in an input/output apparatus housing such that said glass plate is directed up.

* * * * *